United States Patent
Yasuda et al.

(10) Patent No.: US 9,551,851 B2
(45) Date of Patent: *Jan. 24, 2017

(54) OPTICAL-ELECTRIC COMPOSITE CABLE

(71) Applicant: Hitachi Metals, Ltd., Tokyo (JP)

(72) Inventors: Hiroki Yasuda, Mito (JP); Osamu Seya, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/250,602

(22) Filed: Apr. 11, 2014

(65) Prior Publication Data

US 2015/0041177 A1   Feb. 12, 2015

(30) Foreign Application Priority Data

Aug. 6, 2013  (JP) ................. 2013-163027

(51) Int. Cl.
*H01B 7/00*       (2006.01)
*G02B 6/44*       (2006.01)
*H01B 7/04*       (2006.01)

(52) U.S. Cl.
CPC ............... *G02B 6/4416* (2013.01)

(58) Field of Classification Search
USPC ..................................................... 385/101
See application file for complete search history.

(56) References Cited

U.S. PATENT DOCUMENTS

| | | | | |
|---|---|---|---|---|
| 4,389,088 A | * | 6/1983 | Trezequet | 385/111 |
| 4,552,432 A | * | 11/1985 | Anderson et al. | 385/101 |
| 5,418,878 A | * | 5/1995 | Sass | H01B 11/1891 |
| | | | | 385/101 |
| 5,495,546 A | * | 2/1996 | Bottoms et al. | 385/101 |
| 6,445,859 B1 | * | 9/2002 | Witt | G02B 6/4495 |
| | | | | 385/109 |
| 6,681,070 B2 | * | 1/2004 | Cecchi | G02B 6/441 |
| | | | | 385/109 |
| 7,035,511 B1 | * | 4/2006 | Rhoney | G02B 6/4471 |
| | | | | 385/100 |
| 7,469,088 B2 | * | 12/2008 | Nothofer | G02B 6/4432 |
| | | | | 385/110 |

(Continued)

FOREIGN PATENT DOCUMENTS

| | | |
|---|---|---|
| CN | 201315173 Y | 9/2009 |
| CN | 203070816 U | 7/2013 |

(Continued)

OTHER PUBLICATIONS

Elastic Properties and Young Modulus for some Materials The Engineering ToolBox Oct. 17, 2012.*

(Continued)

*Primary Examiner* — Timothy Thomas
*Assistant Examiner* — Michael F McAllister
(74) *Attorney, Agent, or Firm* — Roberts Mlotkowski Safran Cole & Calderon, PC (57) ABSTRACT

An optical-electric composite cable includes an optical fiber, an inner tubular cover enclosing the optical fiber, a plurality of electric wires arranged outside the inner tubular cover, a binding member collectively bundling the plurality of electric wires, and an outer tubular cover covering an outer periphery of the binding member. A gap exists between the binding member and the outer tubular cover.

21 Claims, 3 Drawing Sheets

(56) References Cited

U.S. PATENT DOCUMENTS

| | | | |
|---|---|---|---|
| 8,859,902 B2 | 10/2014 | Matsuda et al. | |
| 2010/0166374 A1* | 7/2010 | Lapp | 385/101 |
| 2010/0243097 A1* | 9/2010 | Jani | 138/129 |
| 2011/0139485 A1 | 6/2011 | Matsuda et al. | |
| 2011/0247856 A1* | 10/2011 | Matsuda et al. | 174/108 |
| 2011/0280527 A1* | 11/2011 | Tamura | G02B 6/4433 |
| | | | 385/101 |
| 2011/0311191 A1* | 12/2011 | Hayashishita | G02B 6/4416 |
| | | | 385/101 |
| 2012/0163758 A1* | 6/2012 | McCullough et al. | 385/101 |
| 2014/0079359 A1 | 3/2014 | Yu et al. | |

FOREIGN PATENT DOCUMENTS

| | | |
|---|---|---|
| JP | 2011-018544 | 1/2011 |
| JP | 2011-142070 A | 7/2011 |
| JP | 2012-059430 A | 3/2012 |
| JP | 2013-058335 | 3/2013 |

OTHER PUBLICATIONS

Notice of Offer of information filed with JPO on Oct. 20, 2015 by third party.
Notice from Japanese Patent Office re: Information Offer Form on Prior Arts for Japanese patent application No. 2013-163027, submitted on Feb. 9, 2016 and English translation thereof.
Chinese Office Action for corresponding Chinese Patent Application No. 201410058453.X dated Oct. 19, 2016 and English translation thereof.

* cited by examiner

SLIDE OF WIRE

BENDING

FIG.6

OPTICAL-ELECTRIC COMPOSITE CABLE

The present application is based on Japanese patent application No. 2013-163027 filed on Aug. 6, 2013, the entire contents of which are incorporated herein by reference.

BACKGROUND OF THE INVENTION

1. Field of the Invention

The invention relates to an optical-electric composite cable having an optical fiber(s) and plural electric wires.

2. Description of the Related Art

An optical-electric composite cable is known that is used for e.g. signal transmission between electronic devices such as personal computer or display and that an optical fiber and plural electric wires are collectively covered by a sheath. Some optical-electric composite cables are configured to prevent an increase in optical loss caused by microbending of the optical fiber (slight bending of a central axis of a core caused by pressure (lateral pressure) applied from a side surface) (See e.g. JP-A-2011-018544 and JP-A-2012-009156).

The optical-electric composite cable disclosed in JP-A-2011-018544 is constructed such that an optical fiber is arranged in the center and plural covered conductors are arranged to surround the optical fiber. In addition, high-tensile fiber such as Kevlar (trademark) is filled between the optical fiber and the plural covered conductors. In this optical-electric composite cable, an external force from outside of the sheath is absorbed by a covering of the covered conductor and is also dispersed by the high-tensile fiber, and it is thereby possible to reduce lateral pressure acting on the optical fiber.

The optical-electric composite cable disclosed in JP-A-2012-009156 is constructed such that an optical fiber is arranged so as to be in contact with an inner peripheral surface of a protective tube and plural electric wires are arranged around an outer periphery of the protective tube. In this optical-electric composite cable, since the optical fiber is protected from an external force by the protective tube, bending or twisting of the optical fiber due to the external force is suppressed and an increase in transmission loss is thus suppressed.

The related arts may be JP-A-2011-018544, JP-A-2012-009156 and Japanese patent application No. 2012-206722 (i.e., JP-B-5273284)

SUMMARY OF THE INVENTION

The optical-electric composite cable disclosed in JP-A-2011-018544 may have the problem that since the high-tensile fiber between the optical fiber and the plural covered conductors is filled at a density allowing the external force to be dispersed, there is no gap around the optical fiber and the external force may act as lateral pressure on the optical fiber via the high-tensile fiber.

The optical-electric composite cable disclosed in JP-A-2012-009156 may have the problem that bending or twisting of the optical fiber caused by the external force can be prevented if the protective tube is sufficiently strengthened against the external force which may act on the optical-electric composite cable, but this causes a decrease in flexibility of the cable.

It is an object of the invention to provide an optical-electric composite cable that is adapted to reduce an optical loss caused by the microbending of optical fiber while suppressing a decrease in flexibility.

(1) According to one embodiment of the invention, an optical-electric composite cable comprises:
  an optical fiber;
  an inner tubular cover enclosing the optical fiber;
  a plurality of electric wires arranged outside the inner tubular cover;
  a binding member collectively bundling the plurality of electric wires; and
  an outer tubular cover covering an outer periphery of the binding member,
  wherein a gap exists between the binding member and the outer tubular cover.

In the above embodiment (1) of the invention, the following modifications and changes can be made.
  (i) The gap is not less than 50 μm.
  (ii) The binding member is helically wound around the plurality of electric wires so as to be in contact with the outer periphery of the plurality of electric wires.
  (iii) A winding pitch of the binding member is not less than 5 mm and not more than 200 mm.
  (iv) The plurality of electric wires are arranged so that the radial center of each electric wire is located on a circle having a diameter Pd and centered at the central axis of the inner tubular cover, and the following inequality is satisfied:

$$15 \leq P/Pd \leq 30$$

where P is the winding pitch of the binding member.
  (v) An elastic modulus of the outer tubular cover is not less than 0.01 GPa and not more than 1 GPa.
  (vi) The binding member comprises one of a paper tape, a polytetrafluoroethylene (PTFE) tape and a polyethylene terephthalate (PET) tape.
  (vii) The binding member further comprises a shield layer on an outer periphery of the tape.
  (viii) The binding member comprises a conductive tape.
  (ix) The plurality of electric wires are helically wound along an outer peripheral surface of the inner tubular cover so as to be interposed between the inner tubular cover and the binding member, and
  wherein the cable is configured to reduce a load applied to the inner tubular cover by an external force from the outer periphery side of the binding member by contact between adjacent electric wires and sliding of the electric wires with respect to the inner tubular cover.

Effect of the Invention

According to one embodiment of the invention, an optical-electric composite cable can be provided that is adapted to reduce an optical loss caused by the microbending of optical fiber while suppressing a decrease in flexibility.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

First Embodiment

Figure 1:
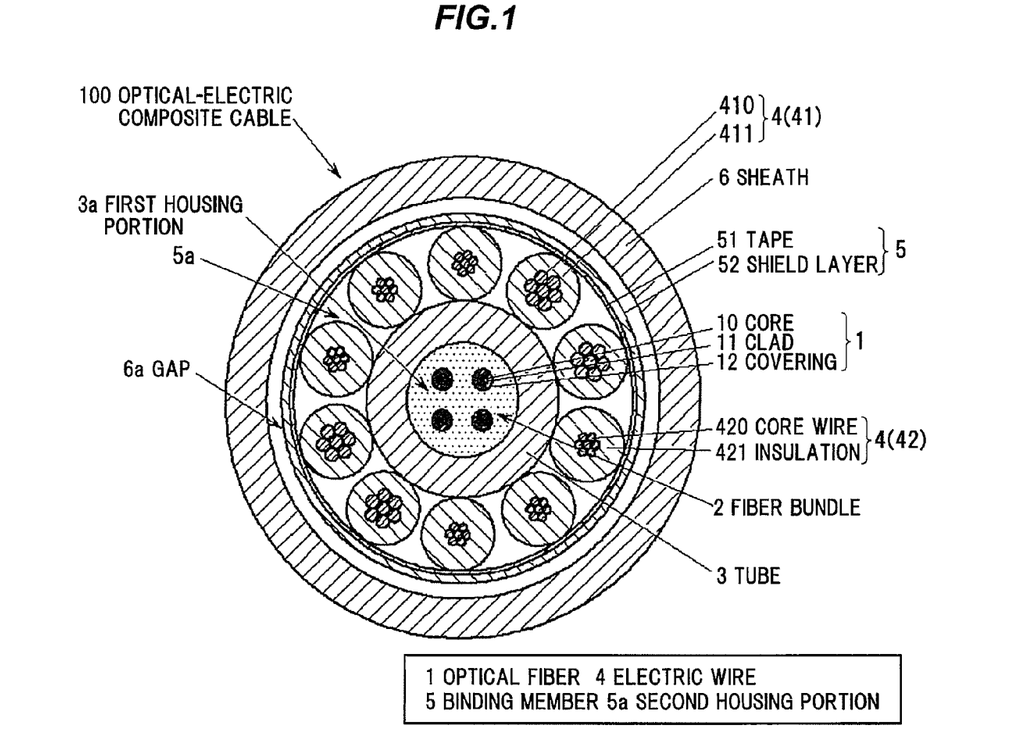
FIG. 1 is a cross sectional view showing an optical-electric composite cable in a first embodiment of the present invention.
Figure 2:
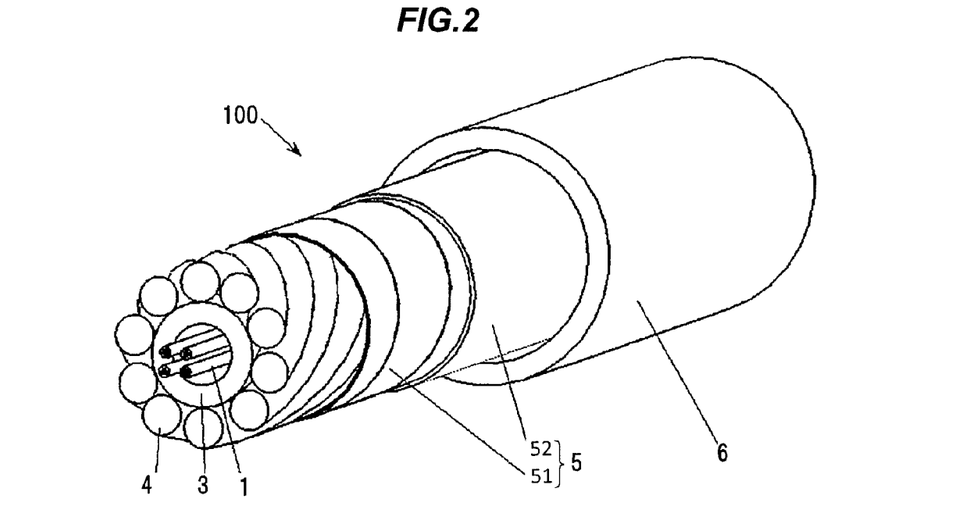
FIG. 2 is a perspective view showing a structure of the optical-electric composite cable in the first embodiment of the invention.
Figure 3:
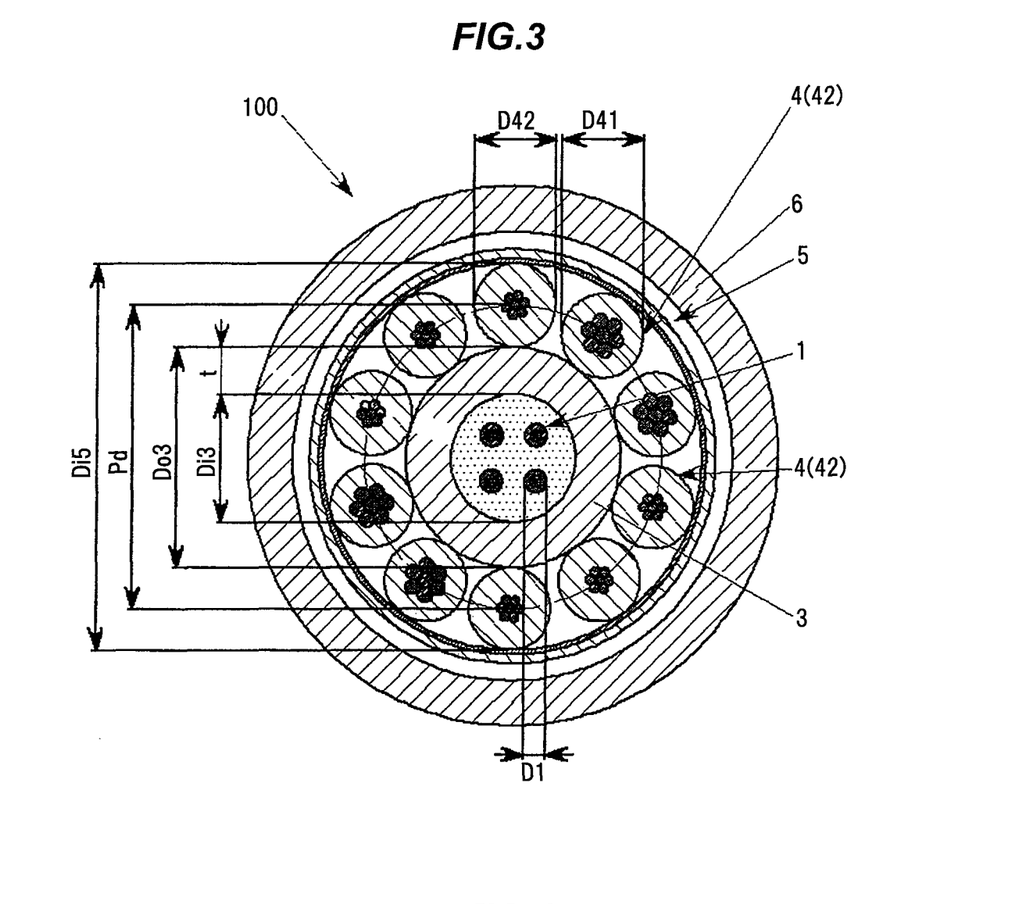
FIG. 3 is an explanatory cross sectional view showing arrangement of electric wires in the optical-electric composite cable.

The first embodiment of the invention will be described in reference to FIGS. 1, 2 and 3. FIG. 1 is a cross sectional view showing an optical-electric composite cable 100 in the first embodiment of the invention. FIG. 2 is a perspective view showing a structure of the optical-electric composite cable 100. In FIG. 2, illustrations of core wires 410 and 420 of electric wires 4 are omitted. FIG. 3 is an explanatory cross sectional view showing arrangement of the electric wires 4 in the optical-electric composite cable 100.

The optical-electric composite cable 100 is provided with optical fibers 1, a tube 3 as a resin inner tubular cover for housing the optical fibers 1, plural electric wires 4 arranged on the outside of the tube 3, a binding member 5 for bundling the plural electric wires 4 all together and a sheath 6 as a resin outer tubular cover arranged on the outer periphery of the binding member 5.

In the first embodiment, four optical fibers 1 and a fiber bundle 2 formed by bundling fibers such as aramid or Kevlar (trademark) are housed in a first housing portion 3a inside the tube 3. The fiber bundle 2 is an example of a fibrous reinforcement member for increasing tensile strength of the optical-electric composite cable 100. The fiber bundle 2 is desirably filled so that a ratio of void space inside the tube 3 is not less than 35%. However, the fiber bundle 2 does not need to be provided when the required tensile strength is ensured by the tube 3 or the sheath 6.

The optical fiber 1 has a core 10 in the center, a clad 11 covering an outer periphery of the core 10 and a covering 12 for covering an outer periphery of the clad 11. In the first embodiment, each of the four optical fibers 1 has the same structure and the same outer diameter. In this regard, however, the four optical fibers 1 may have outer diameters different from each other. In addition, the optical fiber 1 may be either a multi-mode optical fiber or a single-mode optical fiber.

The tube 3 is formed of fluorinated ethylene propylene (FEP), perfluoroalkoxy alkane (PFA), polyvinylidene fluoride (PVDF) or polyether ether ketone (PEEK). In addition, an elastic modulus of the tube 3 is desirably not less than 0.3 GPa and not more than 4.0 GPa. If the elastic modulus of the tube 3 is less than 0.3 GPa, an effect of protecting the optical fiber 1 is poor. On the other hand, the elastic modulus of more than 4.0 GPa causes a decrease in flexibility of the optical-electric composite cable 100.

The plural electric wires 4 are housed in an annular second housing portion 5a between an inner peripheral surface of the binding member 5 and an outer peripheral surface of the tube 3. In the first embodiment, ten electric wires 4 each having a circular cross section are arranged along the outer periphery of the tube 3 so as not to overlap each other in a radial direction. In addition, the radial center of each electric wire 4 is located on a circle having a diameter Pd and centered at the central axis of the tube 3.

In addition, in the first embodiment, the ten electric wires 4 are composed four power lines 41 and six signal lines 42. The power line 41 is formed by covering plural twisted core wires 410 with a resin insulation 411. The signal line 42 is formed by covering plural twisted core wires 420 with a resin insulation 421. The power line 41 is used for supplying power from an electronic device connected to one end of the optical-electric composite cable 100 to another electronic device connected to another end of the optical-electric composite cable 100. The signal line 42 is used for transmitting and receiving signals between the electronic device and the other electronic device. Alternatively, some of electric wires 4 may be a non-conductive inclusion such as a dummy wire.

The insulations 411 and 421 are preferably formed of fluorinated ethylene propylene (FEP), perfluoroalkoxy (PFA), polyvinylidene fluoride (PVDF), polyethylene (PE), polyvinyl chloride (PVC) or ethylene-vinyl acetate copolymer (EVA) resin. These materials enhance slide between the tube 3 and the electric wire 4 and it is thus possible to prevent twisting or deformation of the tube 3 during production. In addition, since the electric wires 4 can efficiently move when the optical-electric composite cable 100 is bent, a force which is applied to the tube 3 from the electric wires 4 can be suppressed. In other words, it is possible to prevent deformation of the tube 3 and thus to reduce lateral pressure toward the optical fiber 1. The insulations 411 and 421 may be formed of polytetrafluoroethylene (PTFE), polypropylene (PP), polyethylene terephthalate (PET) or polyphenylene sulfide (PPS), etc.

The binding member 5 is composed of a resin tape 51 for bundling the plural electric wires 4 and a shield layer 52 provided on an outer periphery of the tape 51.

Figure 4:
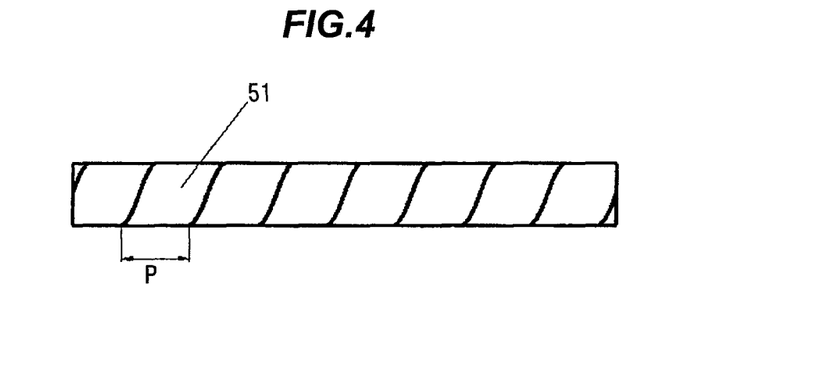
FIG. 4 is a side view showing the optical-electric composite cable in FIG. 1, where illustrations of a sheath and a shield layer are omitted.

FIG. 4 is a side view showing the optical-electric composite cable 100 in FIG. 1, where illustrations of the sheath 6 and the shield layer 52 are omitted. The tape 51 is helically wound around the plural electric wires 4 so as to be in contact with outer surfaces the electric wires 4. A winding pitch of the tape 51 is desirably not less than 5 mm and not more than 200 mm. The winding pitch P of the tape 51 in such a range allows flexibility of the optical-electric composite cable 100 to be ensured while reliably bundling the electric wires 4. When the winding pitch of the tape 51 is less than 5 mm, flexibility of the optical-electric composite cable 100 is impaired. When the winding pitch of the tape 51 is more than 200 mm, breakage of the tape 51 is likely to occur at the time of bending the optical-electric composite cable 100.

In addition, it is desirable to satisfy the following inequality (1):

$$15 \leq P/Pd \leq 30 \tag{1}$$

where Pd is a diameter of the circle on which the plural electric wires 4 are arranged and P is the winding pitch of the tape 51. When P/Pd is less than 15, flexibility of the optical-electric composite cable 100 is impaired. When P/Pd is more than 30, breakage of the tape 51 is likely to occur at the time of bending the optical-electric composite cable 100.

The tape 51 is a paper tape, a polytetrafluoroethylene (PTFE) tape or a polyethylene terephthalate (PET) excellent in flexibility.

The shield layer 52 is, e.g., a braid formed by braiding multiple conductor wires. The conductor wire is formed of aluminum, copper, copper alloy, etc., or such materials plated with nickel, tin or silver, etc.

The sheath 6 is formed of a resin having excellent flexibility such as polyethylene (PE), polyvinyl chloride (PVC), polyurethane (PU), silicone or tetrafluoroethylene-hexafluoropropylene-vinylidene fluoride terpolymer (THV). The outer diameter of the sheath 6 is, e.g., 5.9 mm. In addition, an elastic modulus of the sheath 6 is desirably not less than 0.01 GPa and not more than 1 GPa. When the elastic modulus of the sheath 6 is less than 0.01 GP, the optical-electric composite cable 100 can be excessively bent and excessive lateral pressure may be applied to the optical fiber 1. When the elastic modulus of the sheath 6 is more than 1 GP, flexibility of the optical-electric composite cable 100 decreases. Furthermore, it is desirable that the sheath 6 have a lower elastic modulus than the tube 3.

A gap 6a is provided between the shield layer 52 and the sheath 6. Providing the gap 6a improves flexibility of the optical-electric composite cable 100 as compared to without the gap 6a and also reduces lateral pressure applied to the optical fiber 1 when the optical-electric composite cable 100 is bent. That is, in case of not providing the gap 6a, the electric wires 4 and the tube 3 which have higher elastic modulus than the sheath 6 are also bent together with the sheath 6, hence, it is difficult to bend the optical-electric composite cable 100. In addition, bending applied to the sheath 6 is transferred to the tube 3 without being released, which may cause excessive lateral pressure to be applied to the optical fiber in the tube 3.

On the other hand, since the gap 6a is provided between the shield layer 52 and the sheath 6 in the present embodiment, the binding member 5 and the members therein move in the sheath 6 and escape from bending stress applied to the sheath 6 when the optical-electric composite cable 100 is bent. Therefore, at a certain level of bending, only the sheath 6 is bent and the binding member 5 and the members therein move in the sheath 6 without being bent, which allows flexibility of the optical-electric composite cable 100 to be increased. In addition, since the binding member 5 and the members therein move in the sheath 6 and escape from bending stress, lateral pressure applied to the optical fiber 1 is suppressed.

The size of the gap 6a is defined as the shortest distance between the outer peripheral surface of the binding member 5 and the inner peripheral surface of the sheath 6 in a state that the tube 3 and the sheath 6 are arranged so that the respective central axes coincide with each other, i.e., in a state that the binding member 5 and the members therein are arranged in the center of the optical-electric composite cable 100. The gap 6a is desirably from 50 μm to 3000 μm. When the gap 6a is less than 50 μm, the space in the sheath 6 allowing the binding member 5 and the members therein to move is too narrow and the effect thereof is poor. When the gap 6a is more than 3000 μm, the entire diameter of the optical-electric composite cable 100 becomes too large.

The plural electric wires 4 are helically wound along an outer peripheral surface of the tube 3 so as to be interposed between the tube 3 and the binding member 5, as shown in FIG. 2. That is, central axes of the electric wires 4 are inclined with respect to a direction parallel to the central axis of the tube 3. A helical winding pitch of the plural electric wires 4 (a distance in a direction along the central axis of the tube 3 for winding a given electric wire 4 once around the tube 3) is desirably, e.g., not less than 5 mm and not more than 150 mm.

Since the plural electric wires 4 are helically arranged, flexibility of the optical-electric composite cable 100 is increased as compared to the case where the electric wires 4 are linearly arranged parallel to the central axis of the tube 3, and lateral pressure applied to the optical fiber 1 when bending the optical-electric composite cable 100 is suppressed. That is, when the plural electric wires 4 are arranged parallel to the central axis of the tube 3, it is difficult to bend due to tension generated in an electric wire 4 located on the outer side of the bent portion and the tube 3 is pressed by the tension. In addition, a compressive force which compresses the electric wire 4 in an axial direction acts on an electric wire 4 located on the inner side of the bent portion and impedes bending of the optical-electric composite cable 100, and in addition to this, outwardly bulging curvature is generated on the electric wire 4 due to the compressive force and presses the tube 3. Therefore, the tube 3 is pressed from the inner and outer sides of the bent portion, and lateral pressure acts on the optical fiber 1 when a bend radius is small.

Figure 5:
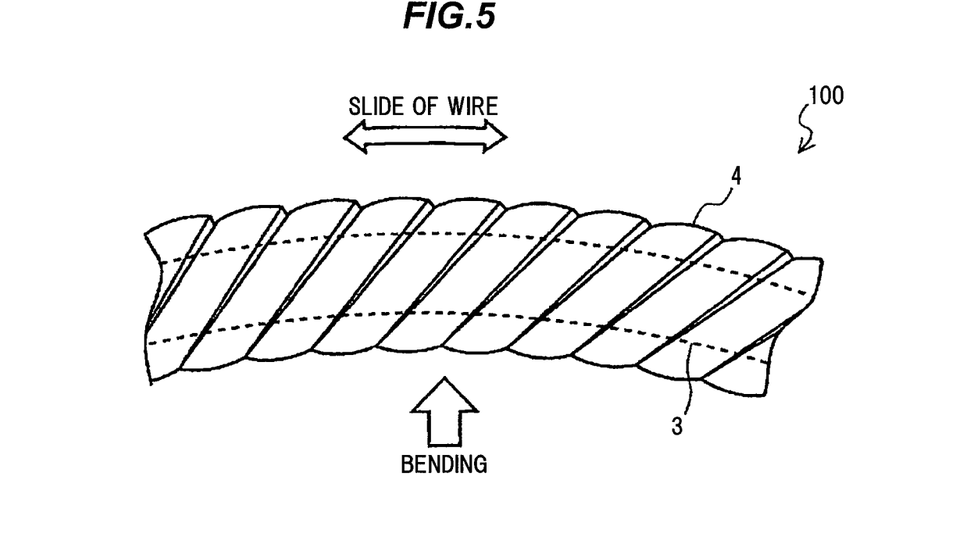
FIG. 5 is a side view showing the optical-electric composite cable in FIG. 1 in a bent state, where illustrations of a sheath, a shield layer and a tape are omitted.

On the other hand, in the first embodiment, since the plural electric wires 4 are helically arranged as shown in FIG. 5, no specific electric wire 4 is arranged throughout the inner or outer side of the bent portion of the optical-electric composite cable 100 (in a region longer than the helical winding pitch). In other words, each electric wire 4 is present on the outer side or inner side of the bent portion with respect to the tube 3 only in a region which is a half or less of the helical winding pitch. As a result, the tension in the portion on the outer side with respect to the tube 3 is balanced out by the compressive force in the portion on the inner side, which reduces a force of the electric wire 4 pressing the tube and increases flexibility of the optical-electric composite cable 100. Note that, illustrations of the sheath 6, the shield layer 52 and the tape 51 are omitted in FIG. 4.

In addition, the electric wires 4 slide with respect to the tube 3 in a cable longitudinal direction when the optical-electric composite cable 100 is bent by an external force acting thereon. The sliding between the tube 3 and the electric wires 4 reduces the force applied to the tube 3 from the electric wires 4 at the time of bending and also suppresses deformation of the tube 3, which allows lateral pressure toward the optical fiber 1 to be reduced. In other words, in the optical-electric composite cable 100, a load applied to the tube 3 by an external force from the outer periphery side of the sheath 6 is reduce by the sliding of the electric wires 4 with respect to the tube 3.

In addition, in the first embodiment, the plural electric wires 4 are formed so that the outer diameter $D_{41}$ of the power line 41 and the outer diameter $D_{42}$ of the signal line 42 are the same in dimension, as shown in FIG. 3. Although the cross sectional area of the plural core wires 410 of the power line 41 is greater than that of the plural core wires 420 of the signal line 42, the insulation 411 of the power line 41 is formed thinner than the insulation 421 of the signal line 42 and the outer diameter of the power line 41 is thus equivalent to that of the signal line 42.

In the first embodiment, although the outer diameter $D_{41}$ of the power line 41 and the outer diameter $D_{42}$ of the signal line 42 are the same in dimension as described above, $D_{41}$ and $D_{42}$ may be different from each other. In this case, it is desirable that the following inequality (2) be satisfied:

$$D_{min} \geq 0.8 \times D_{max} \qquad (2)$$

where $D_{max}$ is an outer diameter of the thickest of the plural electric wires 4 and $D_{min}$ is an outer diameter of the thinnest of the plural electric wires 4.

By determining the outer diameter of the plural electric wires 4 as described above, it is possible to suppress, e.g., constant pressure on the tube 3 from a specific electric wire 4 having a large outer diameter or creation of a large gap between an electric wire 4 having a small outer diameter and an outer peripheral surface of the tube 3 or an inner peripheral surface of the binding member 5.

The plural electric wires 4 come into contact with each other, and a load applied to the tube 3 by an external force from the outer periphery side of the sheath 6 is thus reduced. In other words, when the optical-electric composite cable 100 receives an external force, the sheath 6, the shield layer 52 and the tape 51 are deformed and some of the plural electric wires 4 receive a pressing force applied from the outer peripheral surface of the binding member 5 toward the inside. The electric wire 4 which received the pressing force comes into contact with the tube 3, is deformed into an ellipse shape by receiving a reactive force of the tube 3, and comes into contact with an adjacent electric wire 4. A portion of the pressing force from the binding member 5 is absorbed by this contact between the electric wires 4 and the load applied to the tube 3 is reduced. In other words, deformation of the tube 3 is suppressed.

In order to obtain this effect, the number of the plural electric wires 4 housed in the second housing portion 5a is desirably not less than three and not more than twenty. This is because, in case of one or two electric wires 4, the load applied to the tube 3 cannot be reduced by the contact between the electric wires 4 and, in case of more than twenty electric wires 4, an effect of absorbing the pressing force from the binding member 5 by the contact between the electric wires 4 becomes poor due to a decrease in surface pressure between contact surfaces of the electric wires 4.

In addition, it is desirable that the following inequality (3) be satisfied:

$$(D_{i5}-D_{o3})/2 \times 0.8 \leq D_{max} \leq (D_{i5}-D_{o3})/2 \quad (3)$$

where $D_{o3}$ is an outer diameter of the tube 3, $D_{i5}$ is an inner diameter of the binding member 5 and $D_{max}$ is the maximum value of the outer diameters of the plural electric wires 4, as shown in FIG. 3.

That is, the maximum value of the outer diameters of the plural electric wires 4 should be not less than 80% of a width of the second housing portion 5a (a distance between the outer peripheral surface of the tube 3 and the inner peripheral surface of the binding member 5 in a radial direction about the central axis of the tube 3). As a result, it is possible to surely obtain the effect that the load applied to the tube 3 is reduced by the contact between the electric wires 4.

Meanwhile, it is desirable that a thickness t of the tube 3, which is derived by calculating $(D_{o3}-D_{i3})/2$, satisfy the following formula (4):

$$t \geq D_{o3} \times 0.20 \quad (4)$$

where $D_{i3}$ is an inner diameter of the tube 3 and $D_{o3}$ is the outer diameter thereof.

In other words, the thickness t of the tube 3 should be not less than one-fifth of the outer diameter $D_{o3}$. Strength of the tube 3 is ensured by forming the tube 3 as described above, which suppresses deformation thereof due to an external force and allows lateral pressure acting on the optical fiber 1 in the first housing portion 3a to be reduced.

Note that, the inner diameter $D_{i3}$ and the outer diameter $D_{o3}$ of the tube 3 are dimensions in a state that the tube 3 is not deformed and the inner and outer peripheral surfaces of the tube 3 in a cross section orthogonal to the central axis thereof each have a perfect circular shape, and $D_{i3}$ and $D_{o3}$ are equal to values derived by dividing circumferential lengths of the inner and outer peripheral surfaces on the cross section by $\pi$ (circular constant).

Meanwhile, as shown in FIG. 3, when the outer diameter of the optical fiber 1 is defined as $D_1$, the total value of the outer diameters of the four optical fibers 1 ($D_1 \times 4$) is desirably smaller than the inner diameter ($D_{i3}$) of the tube 3. This is because a gap is formed between the optical fiber 1 and the inner peripheral surface of the tube 3 or between the optical fibers 1 even when the four optical fibers 1 are linearly aligned inside the first housing portion 3a, and the pressing force acting on the tube 3 can be prevented from directly acting as lateral pressure on the optical fiber 1 even when the tube 3 is deformed by the external force in a recessed manner.

Meanwhile, a ratio of void space in the first housing portion 3a of the tube 3 is desirably not less than 35%. The "void space" here refers to a portion inside the first housing portion 3a where the four optical fibers 1 and the fiber bundle 2 are not present. That is, the ratio $R_3$ of void space in the first housing portion 3a is obtained by the following formula (5):

$$R_3 = (C_1 - V_1 - V_2)/C_1 \quad (5)$$

where $C_1$ is the cubic capacity of the first housing portion 3a, $V_1$ is the volume of the optical fibers 1 in the first housing portion 3a and $V_2$ is the volume of the fiber bundle 2 in the first housing portion 3a. Also, the ratio $R_3$ of void space is desirably not less than 35%.

In more detail, a ratio of the volume of the four optical fibers 1 in the first housing portion 3a (occupancy of the optical fibers 1 ($=V_1/C_1$)) should be not less than 2% and not more than 25%. Meanwhile, a ratio of the volume of the fiber bundle 2 in the first housing portion 3a (occupancy of the fiber bundle 2 ($=V_2/C_1$)) should be not less than 2% and not more than 50%. In this case, the ratio $R_3$ of void space is not more than 96% (when the occupancy of the optical fibers 1 and that of the fiber bundle 2 are both 2%). In addition, when the fiber bundle 2 is not housed in the first housing portion 3a, the upper limit of the ratio $R_3$ of void space is 98%.

Even when the tube 3 is deformed by the external force, lateral pressure applied to the optical fiber 1 by the deformation is suppressed when the ratio of void space in the first housing portion 3a is determined as described above. In other words, even when the tube 3 is crushed and deformed by the external force, the deformation is absorbed by narrowing the void space in the first housing portion 3a and the pressing force acting on the tube 3 is prevented from directly acting as lateral pressure on the optical fiber 1.

Effects of the First Embodiment

In the first embodiment, it is possible to reduce optical loss caused by microbending of the optical fiber while suppressing a decrease in flexibility.

Second Embodiment

Figure 6:
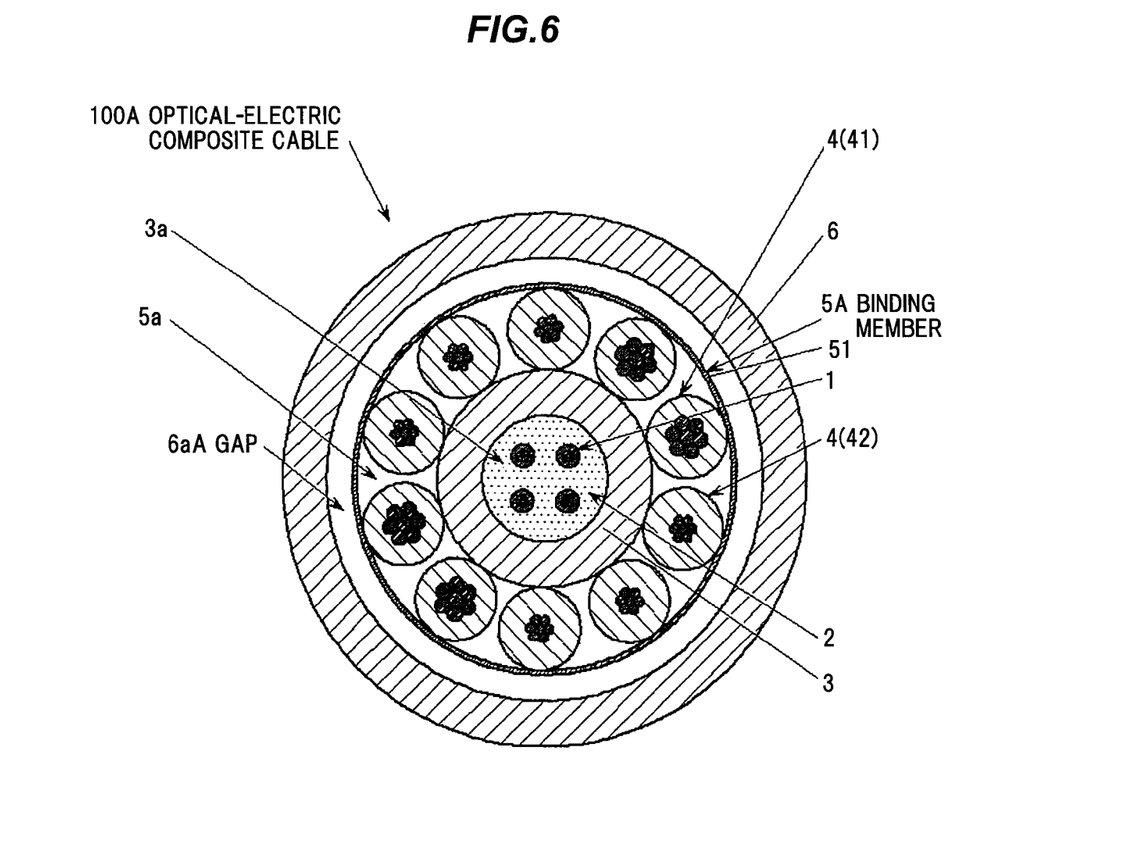
FIG. 6 is a cross sectional view showing an optical-electric composite cable in a second embodiment.

Next, the second embodiment of the invention will be described in reference to FIG. 6. FIG. 6 is a cross sectional view showing an optical-electric composite cable 100A in the second embodiment. In FIG. 6, constituent elements in common with those explained for the optical-electric composite cable 100 in the first embodiment are denoted by the same reference numerals and the explanation thereof will be omitted.

The optical-electric composite cable 100A in the second embodiment has the same structure as the optical-electric composite cable 100 in the first embodiment except the structure of the binding member 5. In other words, the sheath 6 is provided on the outer periphery of the tape 51 with a gap 6aA in between without a shield layer in the optical-electric composite cable 100A of the second embodiment, while the shield layer 52 is provided on the outer periphery of the tape 51 in the optical-electric composite cable 100 of the first embodiment.

The gap 6aA is desirably not less than 50 µm and not more than 3000 µm in the same manner as the first embodiment.

The tape 51 may be a conductive tape in which a conductive metal film is formed on a resin tape.

In the second embodiment, providing the gap 6aA allows optical loss due to microbending of the optical fiber to be reduced while suppressing a decrease in flexibility in the same manner as the first embodiment.

In addition, since the shield layer is not provided, it is possible to downsize the optical-electric composite cable 100 in a radial direction. Furthermore, when the tape 51 is a conductive tape, it is possible to improve shielding properties while downsizing the optical-electric composite cable 100 in a radial direction.

Although the embodiments of the invention have been described, the invention according to claims is not to be limited to the above-mentioned embodiments. Further, please note that all combinations of the features described in the embodiments are not necessary to solve the problem of the invention.

In addition, the invention can be appropriately modified and implemented without departing from the gist thereof.

What is claimed is:

1. An optical-electric composite cable, comprising:
an optical fiber;
an inner tubular cover enclosing the optical fiber;
a plurality of electric wires arranged outside the inner tubular cover;
a binding member collectively bundling the plurality of electric wires; and
an outer tubular cover covering an outer periphery of the binding member,
wherein a gap exists between the binding member and the outer tubular cover,
wherein the gap is a void not less than 50 µm and is not greater than 3000 µm and is the shortest distance between an outer peripheral surface of the binding member and an inner peripheral surface of the outer tubular cover in a state that a central axis of the inner tubular cover and a central axis of the outer tubular cover are arranged to coincide with each other.

2. The optical-electric composite cable according to claim 1, the binding member is helically wound around the plurality of electric wires so as to be in contact with the outer periphery of the plurality of electric wires.

3. The optical-electric composite cable according to claim 2, wherein a winding pitch of the binding member is not less than 5 mm and not more than 200 mm.

4. The optical-electric composite cable according to claim 2, wherein the plurality of electric wires are arranged so that the radial center of each electric wire is located on a circle having a diameter Pd and centered at the central axis of the inner tubular cover, and the following inequality is satisfied:

$$15 \leq P/Pd \leq 30$$

where P is the winding pitch of the binding member.

5. The optical-electric composite cable according to claim 1, wherein an elastic modulus of the outer tubular cover is not less than 0.01 GPa and not more than 1 GPa.

6. The optical-electric composite cable according to claim 1, wherein the binding member comprises one of a paper tape, a polytetrafluoroethylene (PTFE) tape and a polyethylene terephthalate (PET) tape.

7. The optical-electric composite cable according to claim 6, wherein the binding member further comprises a shield layer on an outer periphery of the tape.

8. The optical-electric composite cable according to claim 1, wherein the binding member comprises a conductive tape.

9. The optical-electric composite cable according to claim 1, wherein the plurality of electric wires are helically wound along an outer peripheral surface of the inner tubular cover so as to be interposed between the inner tubular cover and the binding member, and wherein the cable is configured to reduce a load applied to the inner tubular cover by an external force from the outer periphery side of the binding member by contact between adjacent electric wires and sliding of the electric wires with respect to the inner tubular cover.

10. The optical-electric composite cable according to claim 1, wherein a void space is formed between the optical fiber and the inner cover and the void space is not less than 35% of a whole area within the inner cover.

11. The optical-electric composite cable according to claim 1, wherein the gap is the shortest distance between an outer peripheral surface of the binding member and an inner peripheral surface of the outer tubular cover.

12. The optical-electric composite cable according to claim 9, wherein the plurality of electric wires are helically wound at a pitch of not less than about 5 mm and not more than about 150 mm.

13. The optical-electric composite cable according to claim 1, wherein the plurality of electric wires include signal wires and power wires.

14. The optical-electric composite cable according to claim 1, wherein, with respect to the individual outer diameters D of the electric wires, $D_{min} \geq 0.8 \times D_{max}$, wherein $D_{min}$ is the outer diameter of the thinnest of the electric wires and $D_{max}$ is the outer diameter of the thickest of the electric wires.

15. The optical-electric composite cable according to claim 1, wherein $$(D_{i5}-D_{o3})/2 \times 0.8 \leq D_{max} \leq (D_{i5}-D_{o3})/2$$

wherein $D_{o3}$ is an outer diameter of the inner tubular cover, $D_{i5}$ is an inner diameter of the binding member, and $D_{max}$ is the maximum value of the individual outer diameters of the plurality of electric wires.

16. The optical-electric composite cable according to claim 1, wherein a thickness t of the inner tubular cover is determined by $$t \geq D_{o3} \times 0.20$$

wherein $D_{o3}$ is an outer diameter of the inner tubular cover.

17. The optical-electric composite cable according to claim 10, further comprising a fiber bundle surrounding the optical fiber, wherein the inner tubular cover defines a first housing portion that contains the fiber bundle and optical fiber, and wherein the ratio $R_3$ of void space is determined by $$R_3 = (C_1 - V_1 - V_2)/C_1$$

wherein $C_1$ is the cubic capacity of the first housing portion, $V_1$ is the volume of the optical fiber, and $V_2$ is the volume of the fiber bundle.

18. An optical-electric composite cable, comprising:
an optical fiber;

a seamless inner tubular cover enclosing the optical fiber that is integrally-formed around its circumference;

a plurality of electric wires arranged outside the inner tubular cover;

a binding member collectively bundling the plurality of electric wires; and an outer tubular cover covering an outer periphery of the binding member, wherein a gap exists between the binding member and the outer tubular cover, wherein the gap is a void not less than 50 μm and is not greater than 3000 μm, and is the shortest distance between an outer peripheral surface of the binding member and an inner peripheral surface of the outer tubular cover.

19. The optical-electric composite cable according to claim 18, wherein the binding member is helically wound around the plurality of electric wires so as to be in contact with the outer periphery of the plurality of electric wires and a winding pitch of the binding member is not less than 5 mm and not more than 200 mm, and wherein a void space is formed between the optical fiber and the inner cover and the void space is not less than 35% of a whole area within the inner cover.

20. The optical-electric composite cable according to claim 1, wherein the outer tubular cover has a lower elastic modulus than the inner tubular cover enclosing the optical fiber.

21. The optical-electric composite cable according to claim 18, wherein the outer tubular cover has a lower elastic modulus than the inner tubular cover enclosing the optical fiber.

* * * * *